Sept. 14, 1926.  
A. GELL  
1,600,108  
CARD GAME  
Filed May 13, 1926   2 Sheets-Sheet 1
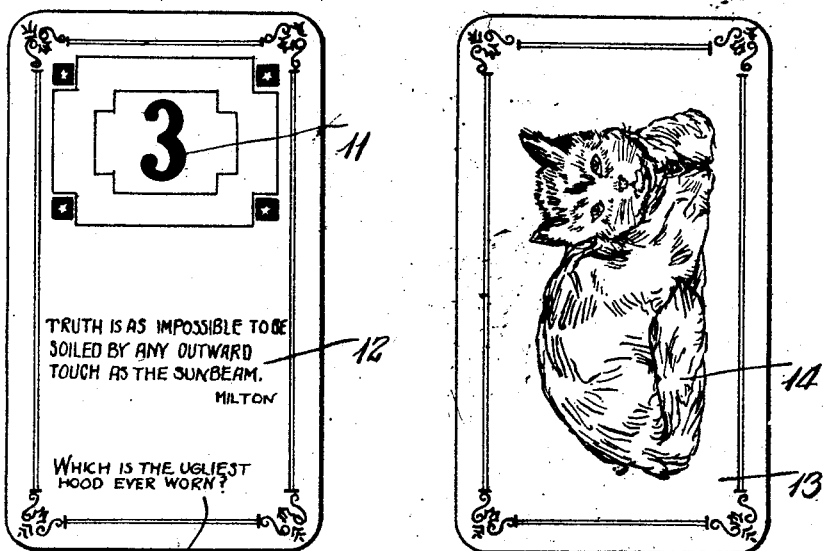
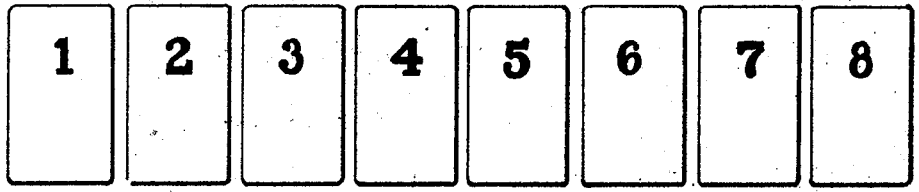
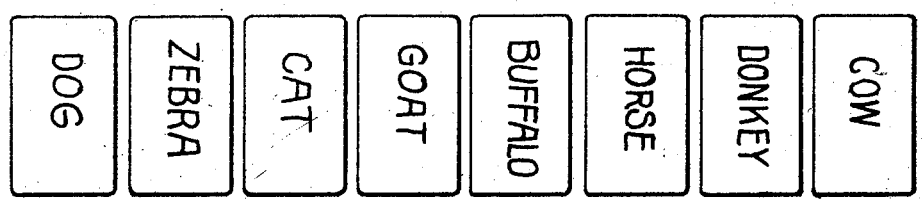
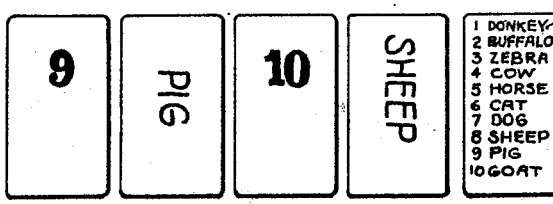
Inventor  
Alfred Gell.  
by  
Bryant & Lowry  
Attorneys Sept. 14, 1926.
A. GELL
1,600,108
CARD GAME
Filed May 13, 1926    2 Sheets-Sheet 2
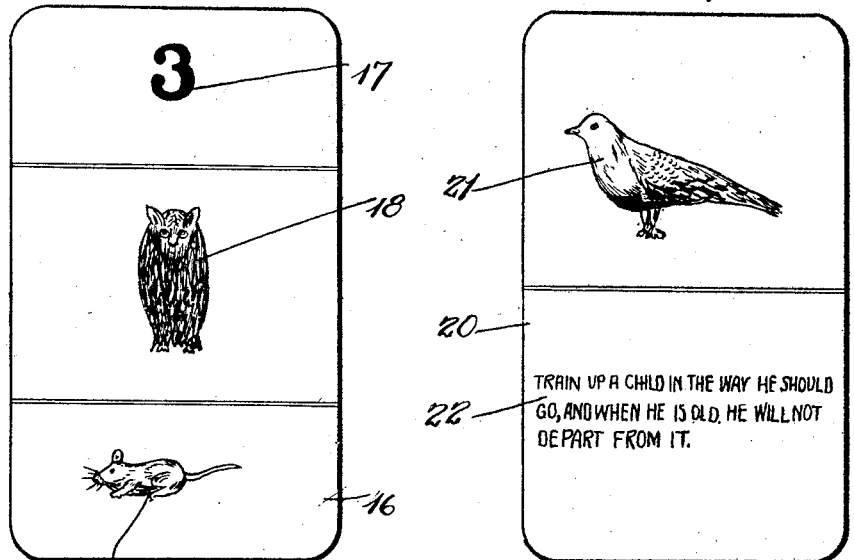

Patented Sept. 14, 1926.

1,600,108

UNITED STATES PATENT OFFICE.

ALFRED GELL, OF PAWTUCKET, RHODE ISLAND.

CARD GAME.

Application filed May 13, 1926. Serial No. 108,899.

This invention relates to educational games and has special reference to an educational card game.

One important object of the invention is to provide a new and interesting educational game whereby spelling may be learned as well as the appearance and names of various quadrupeds, birds and other animal and vegetable forms as well as the appearance and spelling of the names of a wide variety of other physical entities.

A second important object of the invention is to provide a game of this class by means of which quotations from various sources, moral precepts, rules of conduct and the like may be inculcated as well as amusing or instructive questions asked.

With the above and other objects in view, as will be hereinafter apparent, the invention consists essentially of a set or pack of cards bearing certain indications of words to be spelled, these indications being preferably a series of consecutive numbers and one or more series of pictures of birds, quadrupeds or other physical entities.

In the accompanying drawings like characters of reference indicate like parts in the several views, and:

Figure 1 is an obverse view showing one of the cards of the set in its complete form.

Figure 2 is a reverse view thereof.

Figure 3 shows the obverse and reverse of a full set of such cards, the pictorial representations being indicated by words.

Figure 4 is a vew similar to Figure 1 showing a modification of the invention.

Figure 5 is a view of the modified form similar to Figure 2.

Figure 6 is a view similar to Figure 3 showing the modified set complete.

In the two embodiments of the invention herein disclosed it will be seen that there are but ten cards shown as forming a set but it is clearly to be understood that the invention is not limited to any particular number of cards to a set.

In the set as shown in Figures 1 to 3 there is provided ten cards each having an obverse side 10 bearing a numeral 11 and printed matter 12 which may consist of a quotation from a suitable source such as the Bible, a great author or, in games designed for particular groups of persons such as the Boy Scouts, laws, rules or maxims particularly adapted to such persons. Also this printed matter may consist wholly or in part of questions of educational value or amusing conundrums. It is to be noted, however, that while the printed matter is of value educationally it does not enter into the actual play with the cards.

Each card also has a reverse side 13 on which as here shown is the representation of an animal 14 which is preferably in the form of a picture of the animal as shown in Figure 2 but, for convenience in the drawing has been shown in Figure 3 as the name of such animal, it being understood that, in actual manufacture, these names are replaced by suitable pictures. Each numeral and each picture or name indicates a word to be spelled.

In addition to these cards a key card or slip 15 may be used having the names appropriate to all of the animals in the definite order in which they are to be spelled.

In using the cards they are arranged in a pack with the number side or obverse uppermost. Then the operator starts by spelling the first word of the animal series "donkey." As he pronounces each letter of the word he removes a card from the top of the pack and places it on the bottom in consecutive order. Thus for the first of the animal series he pronounces D and removes the first card from the top of the pack and places it on the bottom, O and he treats the second card in the same manner. When the word donkey has been spelled in this manner the card remaining on top of the pack is removed and laid face down before the user. This card will be found to have the representation of a donkey thereon. The user now takes the remainder of the pack, which thus forms a partial series, and spells the second word in the same manner, taking a card off of the top and placing it on the bottom of the pack for each letter spelled. When the word is finished he removes the top card and lays it on that already removed. This operation is continued till all of the cards are piled up in front of him in a new series.

He now picks up the cards thus arranged and spells off the numbers one, two, etc., in the same manner as before except that the removed cards are laid number side down in front of the user in the order in which they are removed. When all of the numbers have been spelled the cards will be found to be in their original order ready for a new spelling of the animal series.

In using the device to teach spelling one person may take the key card or list and read off the names consecutively while the other person manipulates the deck of cards. Obviously the addition or omission of a letter from any word spelled will destroy the sequence of removal of the cards and the pictures turned up will not correspond with the word intended to be spelled.

In the modified form shown in Figures 4, 5 and 6 the obverse 16 displays a numeral 17 and two animals 18 and 19 preferably belonging to different classifications as birds and quadrupeds. In this case the reverse 20 displays a third animal 21 and the printed matter 22 of the same character as previously described. In this form there are four series of words to be spelled in the same manner as before, the cards are primarily arranged with the numeral series in reverse order and the spelling and removal proceeds as follows:—

First time: pheasant, parrot, eagle, owl, duck, vulture, goose, hawk, crane, partridge.

Second time: crow, heron, stork, swan, turkey, pigeon, quail, dove, wren, robin.

Third time: racoon, panther, moose, ram, camel, rat, elk, tiger, fox, lion.

Fourth time: the numerals in order beginning with "one."

While the representations and words here shown apply to numerals and animals it is obvious that other objects may be represented, for instance the first form may have inanimate objects represented, a typical series being of household articles as rocker, bath tub, chair, cot, stove, bed, cup, glass, pan, sofa.

It will now be seen that each card has on it a group of indications of words to be spelled and that the elements of the several groups are arranged in a plurality of series. Also what may be termed the spelling off of one series places the cards in order for the spelling of a succeeding series.

In constructing the cards for the game in order to obtain the proper arrangement any desired number of cards are taken and numbered in succession. A list of names is then selected corresponding in number to the number of cards. The cards are then arranged consecutively in accordance with their numbers and from that list of names the first name is taken and the cards counted off by spelling the name as described in playing the game, after the first name of the list is spelled this name is written on the top card of the pack and this card laid aside. The second name in the list is then counted off in the same manner and the top card marked and so on until all of the cards have been thus marked. If more than one list of names is used the cards are now counted off in like manner for the second list and marked in the same way.

It is to be understood that the invention is limited neither in the number of cards in the set nor the number of series of words indicated, the two sets here shown being merely illustrative of such sets of cards.

There has thus been provided a simple and efficient device of the kind described and for the purpose specified.

Having thus described the invention, what is claimed as new, is:

1. In a device of the kind described, a set of cards each bearing a plurality of indications of words to be spelled, each card having the indications thereon different from the indications on the other cards whereby a plurality of series of indications are provided, the several series being so arranged and the indications of the different series being so grouped that upon the cards being arranged with one series in consecutive order, the second series will be in such order that by spelling the words indicated by series in a definite order starting with the first of the arranged cards as the first letter of the first word of the second series and counting each succeeding letter on the cards in succession, the card following the last letter will bear the indication of said first word.

2. In a device of the kind described, a set of cards each bearing a plurality of indications of words to be spelled, each card having the indications thereon different from the indications on the other cards whereby a plurality of series of indications are provided, the several series being so arranged and the indications of the different series being so grouped that upon the cards being arranged with one series in consecutive order, the second series will be in such order that by spelling the words indicated by series in a definite order starting with the first of the arranged cards as the first letter of the first word of the second series and counting each succeeding letter on the cards in succession, the card following the last letter will bear the indication of said first word, said cards having the indications further arranged and grouped in such manner that the removal of the card bearing the indication of the first word of the second series forms a new arrangement in which the second word of the second series advances to the position of the first word of a partial series one less in number than the original second series whereby cards may be removed in order from the set until the set is exhausted.

3. In a device of the kind described, a set of cards each bearing a plurality of indications of words to be spelled, each card having the indications thereon different from the indications on the other cards whereby a plurality of series of indications are provided, the several series being so arranged and the indications of the different series being so grouped that upon the cards being arranged with one series in consecutive order, the second series will be in such order that by spelling the words indicated by series in a definite order starting with the first of the arranged cards as the first letter of the first word of the second series and counting each succeeding letter on the cards in succession, the card following the last letter will bear the indication of said first word, said cards having the indications further arranged and grouped in such manner that the removal of the card bearing the indication of the first word of the second series forms a new arrangement in which the second word of the second series advances to the position of the first word of a partial series one less in number than the original second series whereby cards may be removed in order from the set until the set is exhausted, said cards further having the indications so arranged and grouped that the order in which said cards are withdrawn from the set establishes a new order for selecting cards from the set by similarly spelling a second series of words corresponding to another series of indications on said cards.

4. In a device of the kind described, a set of cards each bearing a number and at least one word indication, the numbers forming a consecutive series equal in number to the number of cards in the set, the word indications forming a second series, each word being associated with a respective number, the word indications being so associated with the numbers that upon the cards being arranged with the numbers in consecutive order spelling of the first word in the word series by assigning to the arranged cards letters of the word to be spelt beginning with the first letter of the word and the first card of the order in which they are arranged and assigning consecutive letters of the spelling to consecutive cards the card following the last letter of the word will bear the indication of the word spelt.

5. In a device of the kind described, a set of cards each bearing a number and at least one word indication the numbers forming a consecutive series equal in number to the number of cards in the set, the word indications forming a second series, each word being associated with a respective number, the word indications being so associated with the numbers that upon the cards being arranged with the numbers in consecutive order spelling of the first word in the word series by assigning to the arranged cards letters of the word to be spelt beginning with the first letter of the word and the first card of the order in which they are arranged and assigning consecutive letters of the spelling to consecutive cards the card following the last letter of the word will bear the indication of the word spelt, the word indications on said cards being further so associated with the numbers that the removal of a card from the set upon the completion of spelling of the first word having indication corresponding to said word establishes a new order for the remainder of the set wherein the first of the remaining words of the word series becomes the first word of a series forming a consecutively arranged part of the first series.

6. In a device of the kind described, a set of cards each bearing a number and at least one word indication, the numbers forming a consecutive series equal in number to the number of cards in the set, the word indications forming a second series, each word being associated with a respective number, the word indications being so associated with the numbers that upon the cards being arranged with the numbers in consecutive order spelling of the first word in the word series by assigning to the arranged cards letters of the word to be spelt beginning with the first letter of the word and the first card of the order in which they are arranged and assigning consecutive letters of the spelling to consecutive cards the card following the last letter of the word will bear the indication of the word spelt, the word indications on said cards being further so associated with the numbers that the removal of a card from the set upon the completion of spelling of the first word having indication corresponding to said word establishes a new order for the remainder of the set wherein the first of the remaining words of the word series becomes the first word of a series forming a consecutively arranged part of the first series, said cards further having the numbers and word indications so arranged and grouped that the order in which said cards are withdrawn from the set establishes a new order for selecting cards from the set by similarly spelling the names of the numbers of the number series consecutively.

In testimony whereof I affix my signature.

ALFRED GELL.